March 17, 1970   D. BELL III   3,500,686
HEATED ELEMENT FLUID FLOW SENSOR
Filed Sept. 25, 1968

David Bell, III
INVENTOR.
BY
ATTORNEY

# United States Patent Office 3,500,686
Patented Mar. 17, 1970

3,500,686
HEATED ELEMENT FLUID FLOW SENSOR
David Bell III, Houston, Tex., assignor to the United States of America as represented by the Administrator of the National Aeronautics and Space Administration
Filed Sept. 25, 1968, Ser. No. 762,438
Int. Cl. G01f 1/00
U.S. Cl. 73—204                                      1 Claim

ABSTRACT OF THE DISCLOSURE

A heated element fluid flow sensor for sensing the fluid flow in a thermal conductive conduit. It includes a pair of spaced-apart thermocouples arranged for contact with axially spaced-apart points on the outside surface of the conduit, with the heating element spaced therebetween and arranged for heating a portion of the conduit to thereby heat fluid in the conduit. Electrical sensing means are connected to the thermocouples for sensing the flow of fluid in the conduit.

---

The invention described herein was made by an employee of the United States Government and may be manufactured and used by or for the Government for governmental purposes without the payment of any royalties thereon or therefor.

This invention relates to a heated element fluid flow sensor for sensing the fluid flow in a thermal conductive conduit.

When sensing fluid flow in a conduit it is desirable to have a unit which may be easily attached to the conduit (preferably portable) and arranged such that the fluid flow can be detected without inserting a probe into the conduit itself, which would otherwise disturb the fluid flow, create sealing problems, and the like. It is also important to detect not only the rate of fluid flow, but the direction of fluid flow, where it is not desirable to have a permanent flow meter. This is particularly true in the space environment and on space crafts where it has been common practice during checkout to utilize external power to operate various flow systems. In such event, normal spacecraft instrumentation is not available. Thus, to determine if there is flow, the spacecraft would have to be powered internally. Such a method requires additional operational time of spacecraft systems and is considered a safety hazard.

Certain prior art attempts have been made toward finding a solution to the foregoing, but none have been as entirely satisfactory as the present invention. For example, external coils have been mounted about a conduit through which flow is to be tested and heat is applied at certain locations spaced therefrom. However, this type of device is not readily portable nor is it as simple in construction and operation. Other prior art devices have attempted to utilize thin metal film which are exposed to a fluid stream and heated by an electrical current. Again however, this type of unit would not be portable, nor would it be suitable for the intended purpose of the present invention.

It is therefore an object of this invention to provide an improved heated element fluid flow sensor for sensing the fluid flow in a thermal conductive conduit which constitutes a substantial improvement over the prior art and which provides a solution for the problems enumerated.

Briefly stated, this invention is for a heated element fluid flow sensor for sensing the fluid flow in a thermal conductive conduit. It includes the combination of a pair of spaced-apart thermocouples arranged for thermal contact with axially spaced-apart points on the outside surface of the conduit. A heating element is spaced between the pair of thermocouples and arranged for heating a portion of the conduit to thereby heat fluid in the conduit adjacent thereto. Electrical sensing means are provided for sensing the electrical energy produced by the thermocouples to thereby detect fluid flow through the conduit.

In the preferred form of the invention, the electrical sensing means includes means for comparing the electrical energy produced by the thermocouples and providing a read out of the rate and direction of the fluid flow through the conduit. The thermocouples and the heating element are preferably mounted in a portable housing which may be easily placed adjacent to or against the conduit through which flow is to be measured, whereby the heating element and the thermocouples are placed in thermal contact therewith. One form of an electrical sensing means includes a galvanometer calibrated to show direction and rate of fluid flow. Preferably the housing includes insulating means between the heating elements and thermocouples whereby the thermocouples are responsive primarily to heat conducted from the heater through the fluid in the conduit.

Reference to the drawing will further illustrate the invention wherein like numerals refer to like parts and in which.

Figure 1:
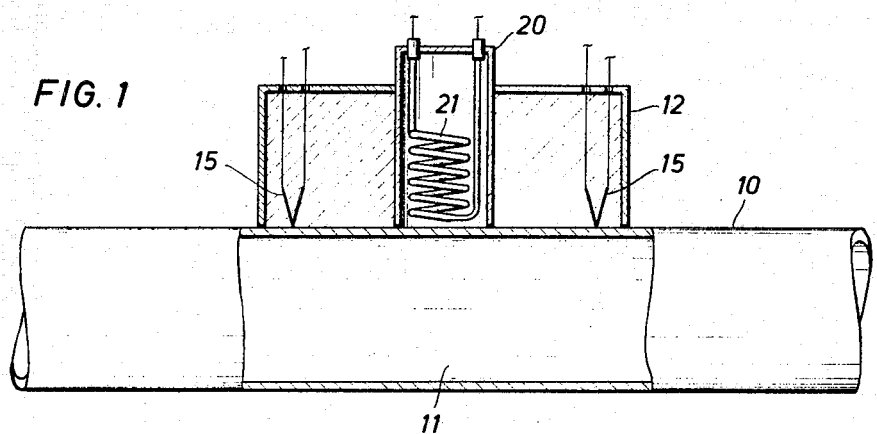
FIG. 1 is a schematic central sectional view of one apparatus embodying this invention mounted adjacent a pipe through which fluid flow is to be tested.

Referring to the drawing, the device of this invention is adapted for positioning adjacent a thermal conductive type pipe made of iron or the like such as pipe 10 with fluid 11 therein.

The apparatus consists of a portable housing 12 which is so shaped and dimensioned as to be easily portable and at the same time constructed so as to be held adjacent to and in contact with a longitudinal length of the outside surface of pipe 10, as shown.

Housing 12 has mounted therein a pair of thermocouples 15, with one provided near each end of the housing 12. Thermocouples 15 are so placed in housing 12 that they will be in thermal contact with pipe 10 when housing 12 is placed thereagainst. Each of the thermocouples 15 is connected by appropriate conductors to sensing means for detecting and reading out variations in electrical energy produced by the thermocouples as indications of flow through pipe 10. One such sensing means could be galvanometer 16 arranged for comparing the electrical energy produced by thermocouples 15 and providing a read out of variations in electrical energy produced by the thermocouples as an indication of the direction and rate of fluid flow in pipe 10.

Housing 12 has a central well therein formed by cylinder 20 in which is mounted heating means in the form of electrical heating coil 21 having a capacity of 40 watts, for example, and power by any convenient electrical source, such as source 22.

Figure 2:
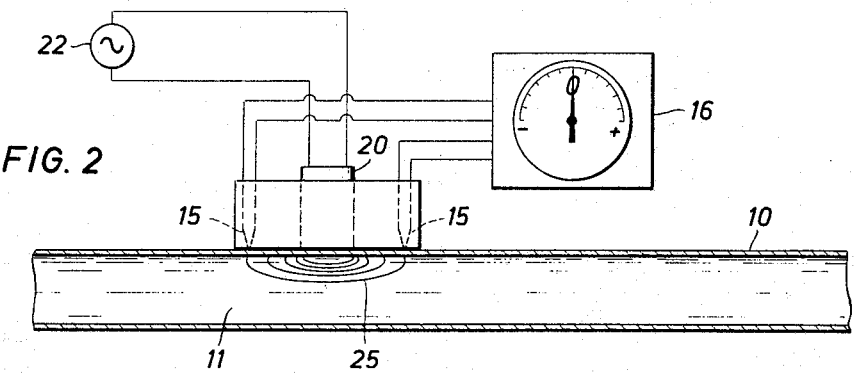
FIG. 2 is a view similar to FIG. 1, but showing in block diagram form the electrical sensing means of the invention, with fluid in the pipe, but no flow therethrough.

In operation, the apparatus of this invention is placed in contact with pipe 10 in the position shown in FIG. 1. Thereafter heating element 21 is energized which thereby heats that portion of pipe 10 adjacent thereto, which causes the heating of the fluid inside of pipe 10 in a pattern such as is demonstrated by heat lines 25 in FIG. 2. Since there is no flow through pipe 10 at this point, and since thermocouples 15 are substantially equally spaced apart from heat element 21, thermocouples 15 produce approximately equal electrical energy. In any event, galvanometer 16 can be adjusted to a null position to compensate for any variations not caused by fluid flow through pipe 10.

Figure 3:
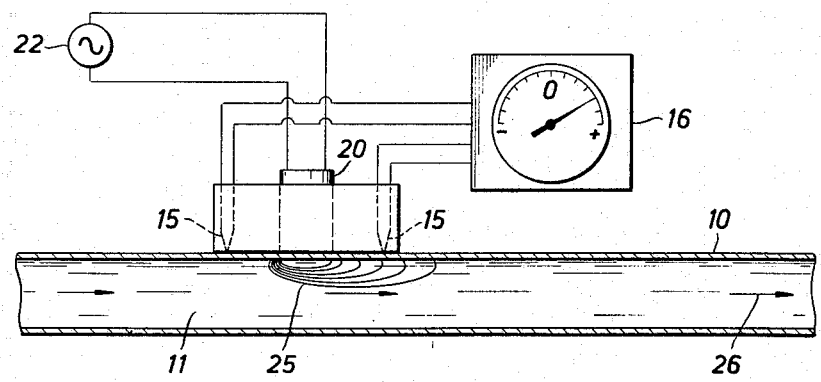
FIG. 3 is a view similar to FIG. 2, but with fluid flow from left to right as shown in the figure.

Thereafter, fluid flow can be commenced through pipe 10, as by pumping and the like, with the result that heating element 21 tends to heat up fluid 11 in conduit 10. Fluid flow in the direction of arrows 26, shown in FIG. 3, tends to cause the heated fluid to move down stream. The result is that the downstream thermocouple 15 will detect a higher temperature than the upstream thermocouple 15, which difference is then sensed and read out by galvanometer 16. It is to be understood that galvanometer 16 is calibrated to show both the direction and rate flow by comparison of the electrical energies produced by the two thermocouples 15.

It will thus be apparent that this invention provides an apparatus which can be used to determine the direction and rate of fluid flow in a conduit without penetration thereinto. It provides a safe system which reduces fire hazards to a minimum. It is portable whereby it may be used in a number of different positions without damage to or intrusion into the conduit itself. It is simple of construction and extremely sensitive to changes in fluid flow.

Further modifications may be made in the invention without departing from the scope thereof. Accordingly, the foregoing description is to be construed as illustrative only and is not to be construed as a limitation upon the invention as defined in the following claim.

What is claimed is:
1. In a heated element fluid flow sensor for sensing the rate and direction of fluid flow in a thermal conductive conduit, the combination comprising:
 a portable housing having a trough-like surface for positioning against the outside surface of said conduit;
 a pair of thermocouples mounted in said housing and arranged for thermal contact with axially spaced apart points on the outside surface of said conduit when said housing is placed thereagainst;
 a well positioned in said housing spaced between and insulated from said thermocouples, said well penetrating through said housing and perpendicular to said conduit;
 an electrical coil heating element mounted in said well and arranged for heating a small portion of said conduit to thereby heat fluid in said conduit adjacent thereto when said housing is placed against said conduit;
 and electrical sensing means connected to said thermocouples for detecting and reading out variations in electrical energy produced by said thermocouples as indications of the direction and rate of fluid flow in said conduit.

References Cited
UNITED STATES PATENTS

| 2,446,283 | 8/1948 | Hulsberg | 73—204 |
| 2,525,197 | 10/1950 | Beams et al. | 73—204 |
| 3,229,522 | 1/1966 | Benson | 73—204 |

FOREIGN PATENTS

| 601,298 | 5/1948 | Great Britain. |
| 45,872 | 12/1935 | France. |

JERRY W. MYRACLE, Primary Examiner